June 25, 1929.　　　H. D. WEISSBERG　　　1,718,266
COMBINED SHADE AND FLOWER HOLDER
Filed July 18, 1928　　2 Sheets-Sheet 1
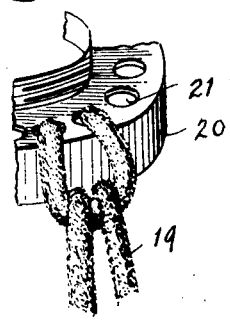
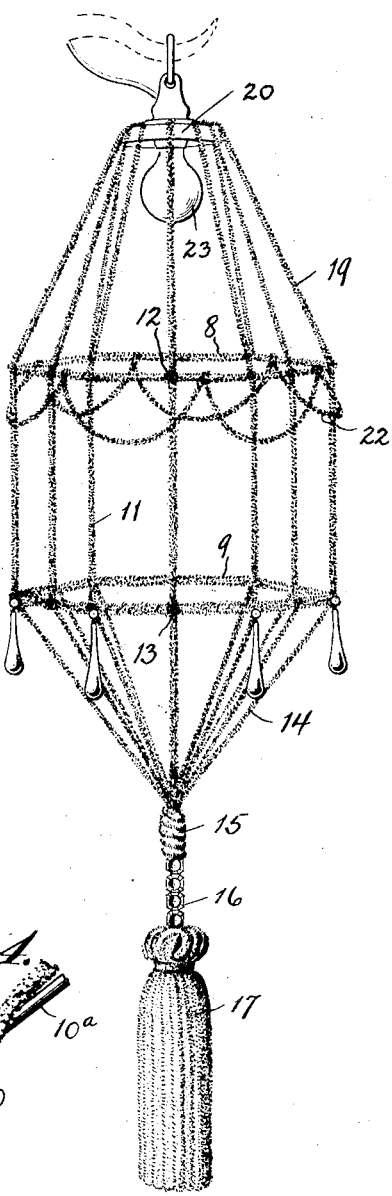
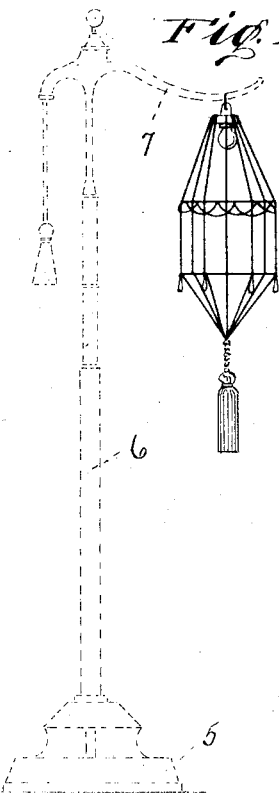
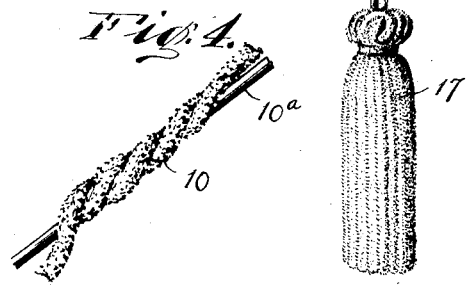
Inventor
Hyman Weissberg
By his Attorney
Aaron L. Applebaum June 25, 1929.  H. D. WEISSBERG  1,718,266
COMBINED SHADE AND FLOWER HOLDER
Filed July 18, 1928   2 Sheets-Sheet 2
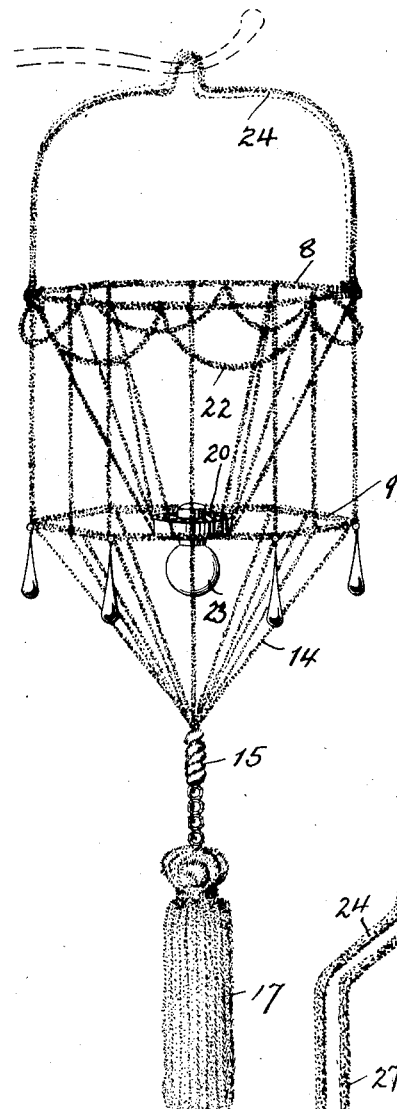
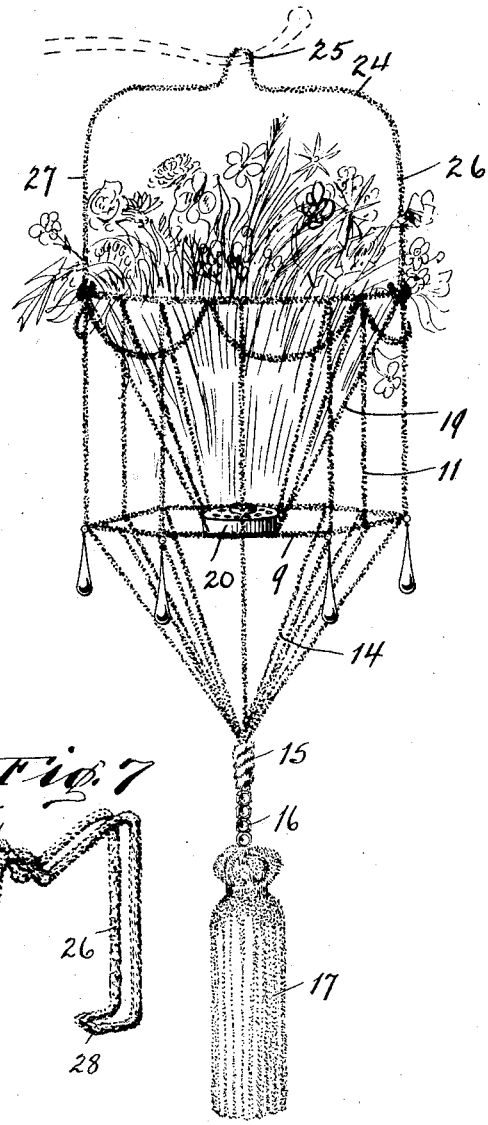
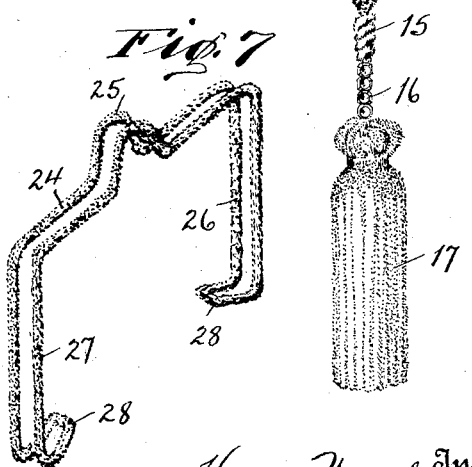
Hyman Weissberg, Inventor
By his Attorney
Aaron L. Applebaum

Patented June 25, 1929.  1,718,266

UNITED STATES PATENT OFFICE.

HYMEN D. WEISSBERG, OF NEW YORK, N. Y.

COMBINED SHADE AND FLOWER HOLDER.

Application filed July 13, 1928. Serial No. 293,735.

This invention relates to ornamental fixture hangings and more particularly to a combined shade and flower holder and has for its object to provide a basket-like, collapsible frame for electric light fixtures, lamp stands and the like capable of being converted to different uses.

One of the objects of my invention is to provide an ornamental hanging fixture consisting of a wire covered, loose and collapsible frame which may be employed as an electric light fixture or as a hanging flower basket.

To enable others skilled in the art to more fully comprehend the underlying features of my invention, reference is had to the accompanying drawing forming a part of this specification in which Fig. 1 is a perspective view showing one application and use of my invention.

Fig. 2 is an enlarged front view.

Fig. 3 is an enlarged fragmentary view showing the strand connection to a socket fixture.

Fig. 4 is an enlarged detail showing the covered wire frame.

Fig. 5 is a view similar to Fig. 2 showing a modified use of the invention.

Fig. 6 is a front view showing the invention when used as a flower basket.

Fig. 7 is a perspective view of a supporting handle.

Referring now to the drawings wherein like reference characters designates corresponding parts throughout the several views, in Fig. 1, I have shown one of the uses and applications of my invention to a lamp base and pedestal 5, 6 having a supporting arm 7 on which it may be suspended. In the form shown by Fig. 2, the ornamental fixture or hanging comprises two spaced polygonal wire frames 8, 9 of any desired shape and size, the wire strands 10$^a$ of said frames being covered by twisted chenille 10 or similar material of any desired color. The frames are connected by a series of uniformly spaced chenille strands 11, twisted about or connected as at 12, 13 to said frames which are of a length to extend above the top frame and below the bottom frame. The lower portions 14 of the chenille strands are brought together at a common point as at 15 and have connected thereto a bead and chenille tassel 16, 17. A series of suspended ornaments 18 may be attached to the bottom frame.

The upper portions 19 of the chenille strands are preferably connected to an annular lamp socket fixture 20, the ends of the strands being looped through the apertures 21 and tied. The ornamental appearance of the hanging is further enhanced by a draped chenille strip 22 connected at various points to the upper frame. When the fixture 20 is connected to the incandescent lamp 23, the hanging cage may be suspended from the arm of the stand pedestal, the lamp being within the upper portion of the loose chenille strands.

In Fig. 5 I have shown the ornamental hanging or cage supported from the arm of a stand pedestal by a hanger which consists of a double bent strand of wire covered by chenille in the same manner as the frames are covered. The hanger comprises a top 24 having an intermediate loop 25, said top having depending suspension arms 26, 27 formed with hooked portions 28 to grip and engage the top frame. It will be seen that in this form of the invention, the fixture 20 and connecting chenille strands may be loosely suspended within the body of the cage or hanging when the hanger is employed.

A further use of the cage or hanging is shown in Fig. 6 wherein it is adapted to be employed as a flower basket and in which the stems, artificial or natural flowers may be supported by the fixture. However, the top frame and chenille strands are sufficiently spaced to hold the foliage in the bouquet form as shown in the above figure.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:—

1. A device of the class described comprising two relatively spaced frames, a series of spaced connected strands fastened to said frames, said strands being of a length to extend above and below the frames, a fixture for connecting the ends of the top strands whereby the holder may be suspended from an object, the end of said bottom strands being gathered and connected for suspension below the bottom frame.

2. A device of the class described comprising two relatively spaced frames, a series of spaced strands fastened to the frames, the ends of said strands extending above and below the frames, means for connecting the ends of the top strands whereby the device may be suspended from an object or hung loosely within the frames, the ends of said bottom strands being gathered and connected for suspension below the bottom frame.

3. A device of the class described comprising two relatively spaced frames, a series of spaced strands fastened to the frames, the ends of said strands extending above and below the frames, means for connecting the top strands whereby the device may be suspended from a lighting fixture or hung loosely within the frames of the device, the ends of said bottom strands being gathered and connected for suspension below the bottom frame, and a hanger for said device.

4. A device of the class described comprising relatively spaced wire frames, a series of loose strands fastened to the frames, the ends of said strands extending above and below the frames, an annular fixture for connecting the ends of the top strands, the ends of said bottom strands being gathered and connected for suspension concentric to said fixture and a hanger for supporting said device when the fixture and top strands are loosely suspended within the frames of said device.

5. A device of the class described comprising wire frames and chenille covering said frames, a series of chenille strands connecting the frames, the ends of said strands being of a length to extend loosely above and below the frames, a fixture for connecting the ends of all of the top strands, the ends of said bottom strands being connected and fastened together concentric to said fixture, a tassel attached to the ends of the bottom strands, and a detachable hanger adapted to be connected to the top frame whereby the device may be suspended when the fixture and loosely connected strands are suspended within the frames of the device.

6. A device of the class described comprising two relatively spaced frames, loosely connected strands fastened to said frames, said strands being of such length as to extend above and below the said frames, the loose ends of the top strands being gathered and a fixture connected to the ends of said top strands.

In testimony whereof I affix my signature.

HYMEN D. WEISSBERG.